United States Patent [19]

Law et al.

[11] 4,420,166
[45] Dec. 13, 1983

[54] STAIR CLIMBER FOR HAND TRUCKS

[75] Inventors: Don C. Law, Bay City; Carl N. Mortenson, Midland; Paul Ripple, Prudenville; Roger S. Eckhardt, Bay City, all of Mich.

[73] Assignee: Magline, Inc., Pinconning, Mich.

[21] Appl. No.: 347,529

[22] Filed: Feb. 10, 1982

[51] Int. Cl.³ .............................................. B62B 5/02
[52] U.S. Cl. .................................................. 280/5.24
[58] Field of Search .......... 280/5.24; 24/72.7, 136 R, 24/201 R, 201 C, 207, 289, 293, 294, 297; 52/716, 728

[56] References Cited

U.S. PATENT DOCUMENTS 3,997,182 12/1976 Mortenson .......................... 280/5.24
4,046,391 9/1977 Restad et al. ....................... 280/5.24
4,275,894 6/1981 Mortenson .......................... 280/5.24

Primary Examiner—John A. Pekar
Assistant Examiner—D. Lynn Fugate
Attorney, Agent, or Firm—Learman & McCulloch

[57] ABSTRACT

A two-wheeled hand truck or dolly with an attached stair climber construction which comprises a body member having a retaining flange overhanging both sides of the body, such flange having two portions spaced from one another by a gap. One of the flange portions is tapered adjacent the gap both longitudinally and transversely. The other portion of the flange tapers inwardly from the one edge of the body. A flexible, resilient, C-shaped synthetic plastic wear member removably embraces the flange, and extends the length of the latter.

19 Claims, 6 Drawing Figures

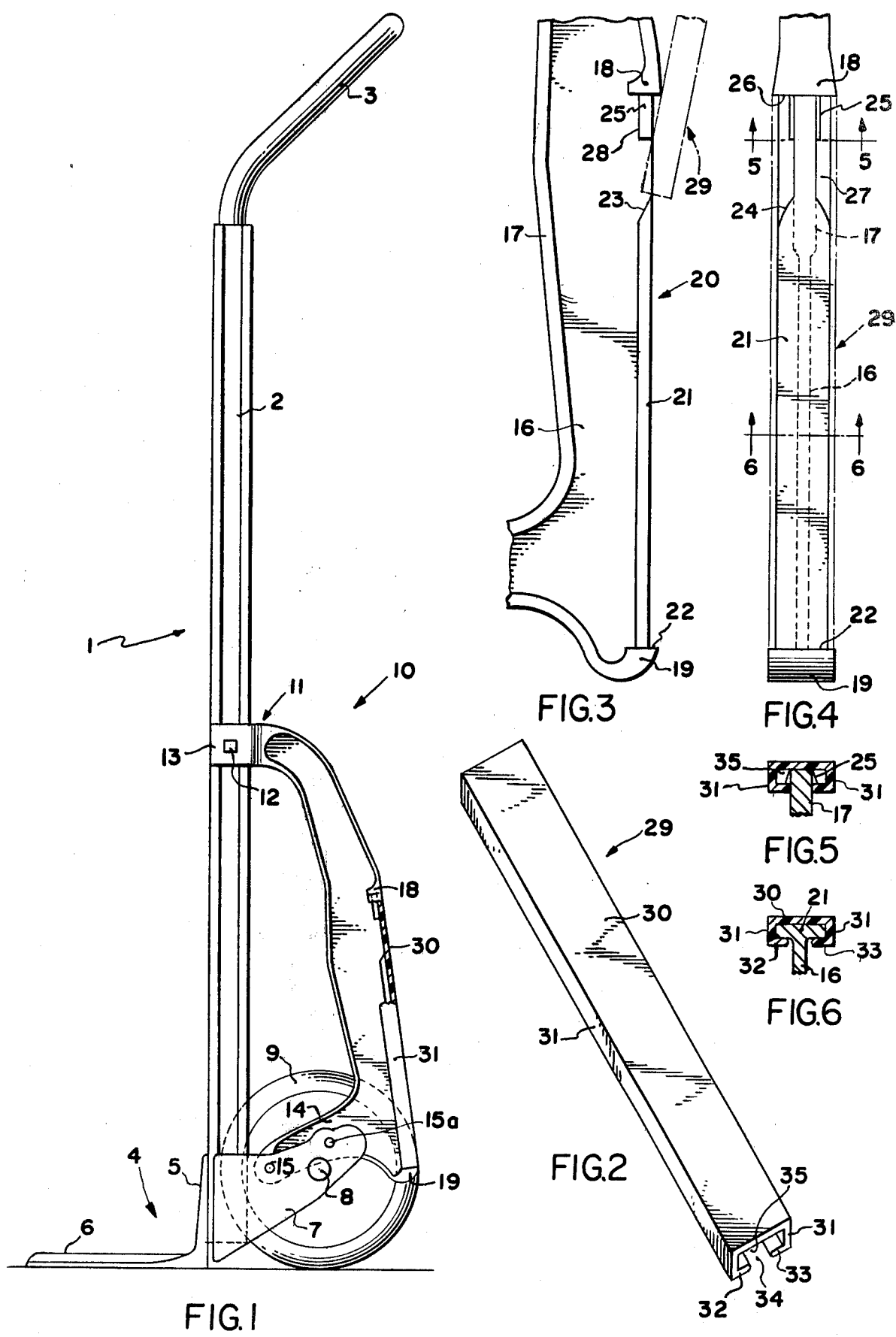

STAIR CLIMBER FOR HAND TRUCKS

BACKGROUND OF THE INVENTION

It is common practice to provide a wheeled hand truck with a pair of stair climber members which project rearwardly from the truck's frame for engagement with the steps of a staircase to facilitate the transport of a load either up or down the staircase. It also is common practice to provide each stair climber member with a wear strip removably fitted at the rear edge of the stair climber to provide protection for the stair climber as well as the steps of a staircase.

Typical stair climbers of the kind with which the invention is concerned are those disclosed in Mortenson U.S. Pat. Nos. 3,997,182 and 4,275,894. Although the stair climber constructions disclosed in such patents have performed quite satisfactorily, the wear strips incorporated in such constructions have required the use of anchoring means separate from the wear strip or the use of specially configured wear strips having attachment tabs which necessitate bending and the use of tools to install and remove them. The construction disclosed herein avoids both of these requirements.

SUMMARY OF THE INVENTION

A stair climber constructed according to the invention has a body adapted to be mounted adjacent the lower end of the frame of a two-wheeled hand truck frame so as to project rearwardly therefrom. The body member has a thin, flat web which terminates at its rear edge in a retaining flange having two separate portions spaced by a gap. One portion of the retaining flange forms, together with the adjacent portion of the web, a T-shaped configuration. The other flange portion extends inwardly of the rear edge of the web and flares so as to provide shoulders on opposite sides of the web adjacent its rear edge. The retaining flange terminates at its opposite ends adjacent abutments.

The stair climber construction also includes a removable wear member. The wear member has walls defining a chamber in which the retaining flange may be accommodated. One wall of the wear member is slotted throughout its length for the accommodation of the web. The wear member may be assembled with the stair climber body by introducing one end of the wear member to the gap between the two retaining flange portions, sliding the wear member along the length of the T-shaped flange portion until the one end of the wear member bears against one of the abutments, and then pushing the other end of the wear member perpendicularly to the flared flange portion so as to enable the walls on opposite sides of the slot to be located and retained beneath the shoulders formed by the flared flange portion. The length of the wear member is such that the other end of the wear member bears against the other abutment.

DESCRIPTION OF THE DRAWINGS

A preferred embodiment of the invention is disclosed in the accompanying drawings in which:

FIG. 1 is a side elevational view, partly in section, of a typical two-wheeled hand truck fitted with a stair climber according to the invention;

FIG. 2 is an isometric view, on an enlarged scale, of a separable wear strip;

FIG. 3 is a fragmentary, greatly enlarged, side elevational view of a portion of a stair climber body and illustrating the manner in which a removable wear member may be fitted to the body member;

FIG. 4 is a fragmentary, end elevational view of the body member shown in FIG. 3; and FIGS. 5 and 6 are sectional views taken on the lines 5—5 and 6—6, respectively, of FIG. 4.

DETAILED DESCRIPTION

Apparatus constructed in accordance with the invention is adapted for use in conjunction with a two-wheeled hand truck 1 of conventional construction. The hand truck 1 disclosed herein conforms to that illustrated in Mortenson U.S. Pat. No. 3,997,182, but the invention is equally applicable to different kinds of hand trucks. The hand truck 1 comprises a pair of upright frame members, one of which is shown at 2 in FIG. 1, joined at vertically spaced intervals by cross bars (not shown) and spanned at their upper ends by a handle 3. At their lower ends the frame members 2 are spanned by a nose piece 4 having an upright flange 5 fixed to the members 2 and a forwardly projecting lip 6.

Also fixed to the lower end of each frame member 2 is a rearwardly projecting bracket 7 in which is secured an axle 8. Journalled on the axle shaft 8 is a pair of preferably rubber tired wheels, one of which is shown at 9.

Fixed to the frame 1 adjacent the wheels 9 is a pair of generally U-shaped stair climber body members 10 each of which has one end 11 provided with a yoke 13 secured by means of a pin 12 to the adjacent frame member 2. At the opposite end of each member 10 is an arm 14 that is fixed to the associated bracket 7 by a pin 15 or the like, there being a second opening 15a in each bracket 7, permitting alternate mounting of the arm 14 at this location if larger diameter wheels 9 are employed.

Each body member 10 is formed with a recess providing a relatively thin, flat web 16 that is bounded by a strengthening marginal bead 17. At the rear of each body member 10, the bead 17 terminates in an upper enlargement forming an abutment 18 and in a lower enlargement forming an abutment 19.

Between the abutments 18 and 19 is a retaining flange structure 20 having a first, linear portion 21 which, together with the web 16, is of T configuration so as to overhang both sides of the web 16. The flange portion 21 terminates at one end at the abutment 19 and the latter is wider than the flange so as to provide shoulders 22. The flange portion 21 terminates at its opposite end short of the abutment 18 and has an inner surface 23 which tapers toward the rear edge of the web 16. The flange 21 also has side edges 24 which taper transversely toward the plane of the web 16.

The retaining flange structure 20 has a second portion 25 that terminates at one end at the abutment 18, the latter extending beyond both sides of the flange to form shoulders 26. The flange portion 25 commences at a point spaced from the tapered surface 23 of the flange portion 21 so as to form between the flange portions 21 and 25 a gap 27. The flange portion 25 flares inwardly from the rear edge of the web 16 and preferably overhangs both sides of the latter to form a pair of forwardly facing shoulders 28.

A C-shaped, molded or extruded wear member 29 formed of resilient, flexible material, such as nylon or the like, has a smooth, rear wall 30, spaced side walls 31 and a pair of inner walls 32 and 33 flanking a longitudinally extending slot 34. The walls form a hollow chamber 35 (FIG. 5) having a width corresponding substantially to the width of the flange portion 21 and a height corresponding substantially to the thickness of the flange portions 21 and 25. The width of the slot 34 is somewhat greater than the thickness of the body web 16, to provide sliding clearance, but is less than the width of the shoulders 28 of the flange portion 25. The length of the wear member 29 corresponds substantially to the distance between the abutments 18 and 19, and the thickness of the side walls 31 corresponds substantially to the width of the associated shoulders 22 and 26. The overall width of the wear member 29 corresponds substantially to the width of the abutments 18 and 19.

To fit a wear member 29 to a stair climber body 10, the member 29 is oriented so that the slot 34 confronts the rear edge of the body member 10. One end of the wear member 29 then may be introduced to the gap 27 between the flange portions 21 and 25 with the slot 34 accommodating the web 16, as is indicated in chain lines in FIG. 3. The member 29 then may be pushed downwardly (as viewed in FIG. 3) or longitudinally of the flange 21 until the lower end of the latter bears against the shoulders 22 of the abutment 19. The upper end of the member 29 then may be pushed toward, or perpendicularly of, the body member 10, whereupon the flared flange portion 25 will flex the side walls 31 and enlarge the slot 34 so that the walls 32 and 33 on opposite sides of the slot pass the shoulders 28. The resilience of the material from which the member 29 is made then will enable the side walls 31 to return to their parallel positions, thereby latching the confronting edges of the walls 32 and 33 under the shoulders 28. The wear member 29 thus will be snugly retained on the rear surface of the stair climber body 10.

The thickness of the walls 30 and 31 preferably is such that the junctures between the wear member and the abutments 18 and 19 are smooth, thereby minimizing the risk of damaging the wear member or the steps of a staircase.

Should it be desired to substitute a fresh wear member 29 for a worn member, the side walls 31 adjacent the abutment 18 may be flexed so as to enlarge the slot 34 and permit the walls 32 and 33 of the member 29 to be drawn over the shoulders 28 of the flange portion 25. Thereafter, the member 29 may be slid upwardly through the gap 27, discarded, and replaced by a fresh wear member.

The mounting and removal of the wear member from a stair climber body may be effected without the use of any tools, and the wear member may be retained in place on its stair climber body without the need for any retaining or anchor elements separate from the body member.

The disclosed embodiment is representative of a presently preferred form of the invention, but is intended to be illustrative rather than definitive thereof. The invention is defined in the claims.

I claim:

1. In a hand truck and stair climber construction wherein a two-handed truck has a pair of wheels; a frame adapted in use to assume a generally vertical position supported by said wheels, the frame having a forwardly projecting nose part to receive a load thereon; and rearwardly projecting stair climbers are mounted on said frame, the stair climbers comprising a body member having a flat web terminating at one edge in a flange, said flange having a first portion overhanging both sides of said web and a second portion overhanging at least one side of said web, said flange portions being separated by a gap, and abutments carried by said body member at opposite ends of and extending beyond said flange.

2. A construction according to claim 1 wherein said first flange portion is tapered toward said gap in a direction longitudinally of said flange.

3. A construction according to claim 1 wherein said first flange portion is tapered toward said gap in a front-to-rear direction transverse to the longitudinal extent of said flange.

4. A construction according to claim 1 wherein said first flange portion is tapered toward said gap in a direction longitudinally of said flange and a front-to-rear direction transverse to the longitudinal extent of said flange.

5. A construction according to claim 1 wherein said second flange portion tapers in a front-to-rear direction.

6. A construction according to claim 1 wherein said second flange portion overhangs both sides of said web.

7. A construction according to claim 6 wherein said second flange portion tapers on both sides of said web in a front-to-rear direction.

8. A construction according to claim 1 including a flexible wear member embracing said flange and extending longitudinally thereof.

9. A construction according to claim 8 wherein said wear member is C-shaped in cross section.

10. A construction according to claim 9 wherein said wear member comprises a walled body defining a chamber of such size as snugly to embrace said flange, one wall of said chamber having a slot in which said web is accommodated.

11. A construction according to claim 8 wherein said wear member has a length corresponding to the spacing between said abutments.

12. A stair climber construction for a hand truck or the like comprising a body member having a web terminating at one edge in a retaining flange a first portion of which overhangs opposite sides of said web and a second portion of which overhangs at least one side of said web, said second portion of said flange flaring in a direction toward said web, said first and second portions of said flange being spaced by a gap.

13. A construction according to claim 12 including a wear member embracing said flange and extending substantially the full length thereof.

14. A construction according to claim 13 including abutments at the opposite ends of said flange for engagement by said wear member.

15. A construction according to claim 13 wherein said wear member comprises a flexible, walled member having a chamber in which said flange is accommodated, one of said walls having a slot therein in which said web is accommodated, said walls being sufficiently flexible to enable said slot to be enlarged to such an extent as to permit said second flange portion to enter said chamber via said slot.

16. A construction according to claim 12 wherein said second flange portion overhangs both sides of said web.

17. A stair climber construction for attachment to a hand truck or the like comprising a body member having a flat web terminating at one edge in a flange, said flange having a first portion overhanging at least one side of said web and a second portion overhanging at least one side of said web, said flange portions being separated by a gap, and abutments carried by said body member at opposite ends of and extending beyond said flange.

18. In a two-wheeled hand truck or dolly structure including: a pair of wheels; a primary frame adapted in use to assume a generally vertical position supported by said wheels; a generally forwardly disposed nose part on said frame projecting forwardly from the lower end of the frame to receive a load thereon; stair climbers having arms secured to the frame and body portions supported such that portions of the rear surfaces are substantially flush with the rear peripheries of the wheels; the improvement wherein the stair climbers comprise a web with overlying longitudinally extending, rearwardly disposed, enlarged width flange portions defining a rear mount portion of increased width relative to said web over a substantial length of said web; longitudinally spaced apart abutment flanges on said web projecting rearwardly of said rear mount portion, the said rear mount portion terminating longitudinally short of the abutment flange on said web at one end; lock surfaces on said web, longitudinally between said rear mount portion and the said abutment flange at said one end; and backer strips are mounted on the said rear mount portion between and in engagement with said abutment flanges so that the rear surfaces of the strips are substantially flush with said abutment flanges, the backer strips comprising resilient synthetic plastic strips with retainer portions thereon spaced forwardly of said rear surfaces to engage under the overlying flange portions, the strips having spaced apart locking portions at one end which are deformable to snap into locked position over said lock surfaces on the webs.

19. The invention defined in claim 18 wherein the backer strips are generally C-shaped in section and have inwardly extending retainer flanges on their edges which comprise said retainer and said locking portions.

* * * * *

UNITED STATES PATENT AND TRADEMARK OFFICE
CERTIFICATE OF CORRECTION

PATENT NO. : 4,420,166
DATED : December 13, 1983
INVENTOR(S) : Don C. Law et al

It is certified that error appears in the above—identified patent and that said Letters Patent are hereby corrected as shown below:

Column 3, line 61, change "two-handed" to -- two-wheeled hand --.

Signed and Sealed this

Twenty-first Day of February 1984

[SEAL]

Attest:

GERALD J. MOSSINGHOFF

Attesting Officer

Commissioner of Patents and Trademarks